United States Patent
Bai et al.

(10) Patent No.: US 8,019,823 B2
(45) Date of Patent: Sep. 13, 2011

(54) METHOD, SYSTEM AND DEVICE FOR INCREASING MULTIMEDIA MESSAGING SERVICE SYSTEM CAPACITY

(75) Inventors: Guangchang Bai, Shenzhen (CN); Dawei Li, Shenzhen (CN); Zhiyuan Zhang, Shenzhen (CN); Weiming Cheng, Shenzhen (CN); Yang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 166 days.

(21) Appl. No.: 12/473,702

(22) Filed: May 28, 2009

(65) Prior Publication Data

US 2009/0233618 A1    Sep. 17, 2009

Related U.S. Application Data

(63) Continuation of application No. PCT/CN2007/070613, filed on Sep. 3, 2007.

(30) Foreign Application Priority Data

Nov. 30, 2006   (CN) .......................... 2006 1 0160851

(51) Int. Cl.
*G06F 15/16* (2006.01)
*G06F 12/00* (2006.01)
(52) U.S. Cl. ...................................... 709/206; 709/207
(58) Field of Classification Search .......... 709/206–207, 709/217–218, 227–229, 250
See application file for complete search history.

(56) References Cited

U.S. PATENT DOCUMENTS 7,876,766 B1 * 1/2011 Atkins et al. .................. 370/401
(Continued)

FOREIGN PATENT DOCUMENTS

CN            1184285 A        6/1998
(Continued)

OTHER PUBLICATIONS

Written Opinion of the International Searching Authority in corresponding PCT Application No. PCT/CN2007/070613 (Dec. 13, 2007).

(Continued)

*Primary Examiner* — Zarni Maung
(74) *Attorney, Agent, or Firm* — Leydig, Voit & Mayer, Ltd.

(57) ABSTRACT

A method for increasing multimedia messaging service system capacity is provided, it comprises: a message distributing device determining a first multimedia messaging service center (MMSC) node for receiving multimedia message, and forwarding the multimedia message to a relay of the first MMSC node, after it having received multimedia message; the multimedia message being transmitted to a server of the first MMSC node by the relay of the first MMSC node, and stored in the server of the first MMSC node; the server of the first MMSC node corresponding to the relay of the first MMSC relay uniquely; the server of the first MMSC node sending the multimedia message to the receipt party via the relay of the first MMSC node and the message distributing device. A system and a device for increasing multimedia messaging service system capacity are provided, too. It can increase the capacity of multimedia messaging service system handling multimedia message service with the invention.

9 Claims, 7 Drawing Sheets

U.S. PATENT DOCUMENTS

| | | | |
|---|---|---|---|
| 2005/0033852 A1* | 2/2005 | Tenhunen | 709/229 |
| 2005/0141522 A1* | 6/2005 | Kadar et al. | 370/396 |
| 2006/0064020 A1* | 3/2006 | Burnes et al. | 600/481 |
| 2007/0298770 A1 | 12/2007 | Lee et al. | |
| 2008/0194277 A1* | 8/2008 | Bai et al. | 455/466 |

FOREIGN PATENT DOCUMENTS

| | | |
|---|---|---|
| CN | 1190211 A | 8/1998 |
| CN | 1553724 A | 12/2004 |
| CN | 1866933 A | 11/2006 |
| CN | 100502572 C | 6/2009 |
| RU | 2359428 C2 | 6/2009 |
| WO | WO 03/058909 A2 | 7/2003 |
| WO | WO 03/094480 A1 | 11/2003 |
| WO | WO 2006/071053 A1 | 7/2006 |

OTHER PUBLICATIONS $1^{st}$ Office Action in corresponding Russian Application No. 2009121503/09 (Sep. 3, 2007).

3GPP TS 23.140, "Technical Specification Group Terminals; Multimedia Messaging Service (MMS); Functional description; Stage 2 (Release 6)", Mar. 2005, 3rd Generation Partnership Project, Valbonne, France.

* cited by examiner

METHOD, SYSTEM AND DEVICE FOR INCREASING MULTIMEDIA MESSAGING SERVICE SYSTEM CAPACITY

CROSS-REFERENCE TO RELATED APPLICATIONS

This application is a continuation of International Patent Application No. PCT/CN2007/070613, filed Sep. 3, 2007, which claims priority to Chinese Patent Application No. 200610160851.8, filed Nov. 30, 2006, both of which are hereby incorporated by reference in their entirety.

FIELD OF THE INVENTION

The present invention relates to Multimedia Messaging Service (MMS) technologies, and in particular to a method, system, and device for increasing a capacity of a multimedia messaging service system.

BACKGROUND OF THE INVENTION

The MMS is a further development of the Short Message Service (SMS) and the Enhanced Message Service (EMS) and provides a complete end-to-end solution for personal multimedia mobile communication services. The MMS enables both information transmission between mobile terminals and the diversity of contents including various combinations of picture, voice, image, data and text. As an open media access platform, the MMS can derive abundant content service applications from interactions between mobile users and Internet content providers. Emergence of the MMS and relevant applications provides operators with a new service increase point while consolidating and further expanding the achievements of operators already gained in message services, so that the operators can strengthen their core competitiveness and are preponderant in severe competition for the telecommunication operation service market.

FIG. 1 illustrates a diagram of a structure of an existing multimedia messaging service system and the connection relationship with the outside world. Referring to FIG. 1, the system includes a relay and a server.

Particularly, the relay is adapted to receive a multimedia message sent from a Wireless Application Protocol (WAP) gateway, a mail server and a Service Provider (SP) server and to perform MM2 encoding of the multimedia message and then transmit it to the server for processing; to receive a message sent from the server and to perform MM1 encoding of a message intended for the WAP gateway and then transmit it to the gateway; to perform MM3 encoding of a message intended for the mail server and then transmit it to the mail server; and to perform MM7 encoding of a message intended for the SP and then transmit it to the mail server.

The server is adapted to receive a multimedia message sent from the relay for storing and processing. The server can interoperate with an application server of an external network via a standard interface and provide a mobile terminal with abundant types of services.

The relay and the server constitute a Multimedia Messaging Service Center (MMSC) node which performs protocols translation, content adaptation, storage and scheduling of a multimedia message and accomplishes an operation of transporting the multimedia message between different multimedia devices.

In summary for above, only one MMSC node which processes all multimedia messages in the present network is present in the existing multimedia messaging service system.

With an increasing of users of the multimedia messaging service, one node cannot process all multimedia messages in a timely way due to a limited processing power of the single node, which may result in a service interruption and an influence upon the use by the users.

For the problem of the limited processing power of the multimedia messaging service in the conventional art, there are primarily two capacity extension methods adopted currently.

One method is a dual-host scheme for a vertical capacity extension by means of extending a Central Processing Unit (CPU)/memory, but the processing power of a dual-host multimedia messaging service in this scheme may be at most a double of that of a single-host one. Further, the CPU/memory in a computer cannot be extended infinitely, and consequently the processing power of its multimedia messaging service may still be limited.

The other method is a capacity extension by segments. This method comprises a plurality of MMSC nodes, such as two MMSC nodes. FIG. 2 is a schematic diagram of a structure of a multimedia messaging service system using a capacity extension by segments. Referring to FIG. 2, the system divides mobile phone numbers with the beginning of 139102 into two number segments, in that 1391020~139104 is the first one whose service is processed by a server 1 and 1391025~139109 is the second one whose service is processed by a server 2. A sender sends a multimedia message to a load balancer. The load balancer determines a relay to receive the multimedia messaging service request according to its load balancing algorithm. The relay relays the multimedia messaging service request to a corresponding server according to a mobile phone number of the sender in a way that the service of the first number segment is processed by the server 1 and the service of the second number segment is processed by the server 2. The server stores the received multimedia message in a multimedia message storage module, reads the multimedia message from the multimedia message storage module upon determination of that a corresponding receiver can receive the multimedia message, and relays it to a relay which is determined according to loads of the relays, and the relay relays the multimedia message to the receiver. This method still has the following problems of limiting the processing power of the multimedia messaging system despite of an increased capacity thereof.

Firstly, since the relays and the servers are separate modules, messages have to be relayed over the network, and the number of cross accesses between hosts is too large, which may result in the problem of a low speed of processing multimedia messages and limit the processing power of the multimedia messaging service system.

Secondly, all of the servers store received multimedia messages centrally into the multimedia message storage module. In the case of a large multimedia message service, an Input/Output (I/O) performance bottleneck of the multimedia message storage module may limit the speed of reading and writing of the multimedia messages, thereby limiting the processing power of the multimedia messaging service system. A demand of operators cannot be satisfied in the case of a large service.

Thirdly, the relays and the servers are separate modules and a situation may occur in which the relays and the servers have different loads due to a limitation of a service type variation, an interface, etc. For example, a relay is fully loaded and a server is far from a full load, which may result in a waste of resources.

Fourthly, this method cannot ensure that the two number segments have exactly uniform service, and the service is interrupted if one of the two servers fails due to an overload, which may affect the user experience.

SUMMARY OF THE PRESENT INVENTION

In view of above, an embodiment of the present invention provides a method for increasing a capacity of a multimedia messaging service system, which may increase a processing power of the multimedia messaging service system.

An embodiment of the present invention provides a system for increasing a capacity of a multimedia messaging service system, which may increase a processing power of the multimedia messaging service system.

An embodiment of the present invention provides an MMSC node for increasing a processing power of a multimedia messaging service system.

To achieve the above objects, technical solutions of the embodiments of the present invention are realized as follows.

A method for increasing a capacity of a multimedia messaging service system includes the steps of: (1) determining, by a message distribution device upon receiving a multimedia message sent from a sender, a first Multimedia Messaging Service Center MMSC node to receive the multimedia message, and relaying the multimedia message to a relay of the first MMSC node; (2) delivering, by the relay of the first MMSC node, the multimedia message to a server of the first MMSC node for storage, wherein the server of the first MMSC node is one-to-one corresponding to the relay of the first MMSC node; and (3) sending, by the server of the first MMSC node, the multimedia message to a receiver through the relay of the first MMSC node and the message distribution device.

A system for increasing a capacity of a multimedia messaging service system includes a message distribution device and at least two MMSC nodes. The MMSC nodes each include a relay and a server corresponding uniquely to the relay. The relay is adapted to transfer a message between the message distribution device and the server corresponding to the relay. The server is adapted to receive a multimedia message sent from the corresponding relay and store the multimedia message, and send the multimedia message to the corresponding relay. The message distribution device is adapted to receive the multimedia message, to determine an MMSC node to process the multimedia message, relay the multimedia message to the relay of the MMSC node and receive and relay the multimedia message sent from the relay.

A Multimedia Messaging Service Center MMSC node includes a relay and a server one-to-one corresponding to the relay and a shared memory. The relay is adapted to receive a multimedia message sent from a message distribution device and relay the multimedia message to the server through the shared memory. The server is adapted to store the multimedia message sent from the relay and send the multimedia message to the relay through the shared memory, which is delivered to a receiver through the relay and the message distribution device. The shared memory is adapted to transfer the message between the relay and the corresponding server.

As can be seen from the above solutions, the method, system, and device for increasing a capacity of a multimedia messaging service system provided according to the embodiments of the present invention proposes a peer cluster solution for a capacity extension of a large capacity multimedia messaging service. In the present solution a relay and a server constitute correspondingly an independent MMSC node, so that processing of the same multimedia message is accomplished on the same node in the system, thereby reducing cross accesses between MMSC nodes and improving the speed of transferring the message. Since the server stores a received multimedia message by itself instead of centralized storage at a multimedia message storage module, each MMSC node can enable independently I/O reading and writing of the multimedia message, avoiding the problem of limited service processing of the multimedia messaging service system due to centralized reading and writing of the multimedia messages, and increasing the processing power of the multimedia messaging service system.

DETAILED DESCRIPTION OF THE INVENTION

The present invention will be described in details hereinafter with reference to the drawings and the embodiments to make the objects, technical solution and advantages of the present invention more apparent.

A method for increasing a capacity of a multimedia messaging service system according to an embodiment of the present invention provides a peer cluster solution for a horizontal capacity extension of a large capacity multimedia messaging service, and its primary idea constitutes a relay and a server correspondingly an MMSC node. A message distribution device determines an MMSC node to process the multimedia message upon receiving the multimedia message and relays the multimedia message to the relay of the MMSC node. The relay of the MMSC node relays the received multimedia message to the server uniquely corresponding to the relay and the server stores the multimedia message. The server delivers the multimedia message through the corresponding relay corresponding and the message distribution device.

A system for increasing a capacity of a multimedia messaging service system according to an embodiment of the present invention includes a message distribution device and at least two MMSC nodes.

Particularly, the MMSC nodes include a relay and a server corresponding to the relay.

The relay is adapted to transfer a message between the message distribution device and the server corresponding to the relay. The server is adapted to receive and store the multimedia message sent from the relay corresponding to the server and to process and then transmit the multimedia message to the relay corresponding to the server.

The message distribution device is adapted to receive the multimedia message, to determine an MMSC node to process the multimedia message, relay the multimedia message to the relay of the MMSC node and to receive the multimedia message sent from the relay and then relay the multimedia message.

The peer cluster solution will be described below taking an example of a peer cluster architecture including four nodes. In this embodiment, a relay and a server corresponding to the relay constitute an MMSC node in a way that both the relay and the server process are incorporated on a host. A message distribution device in this embodiment is a load balancer.

Figure 1:
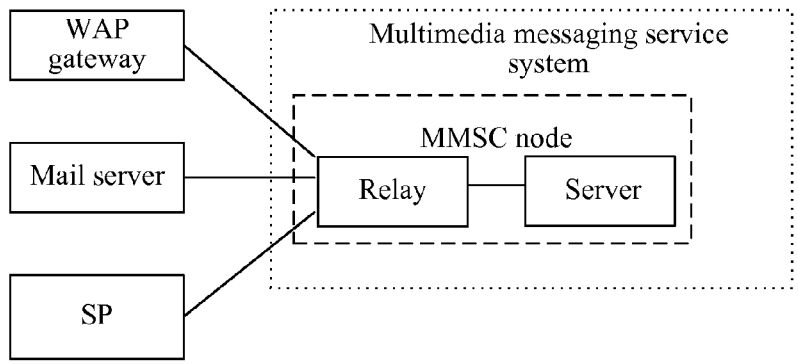
FIG. 1 is a schematic diagram of a structure of an existing multimedia messaging service system and its connection relationship with the outside world.
Figure 2:
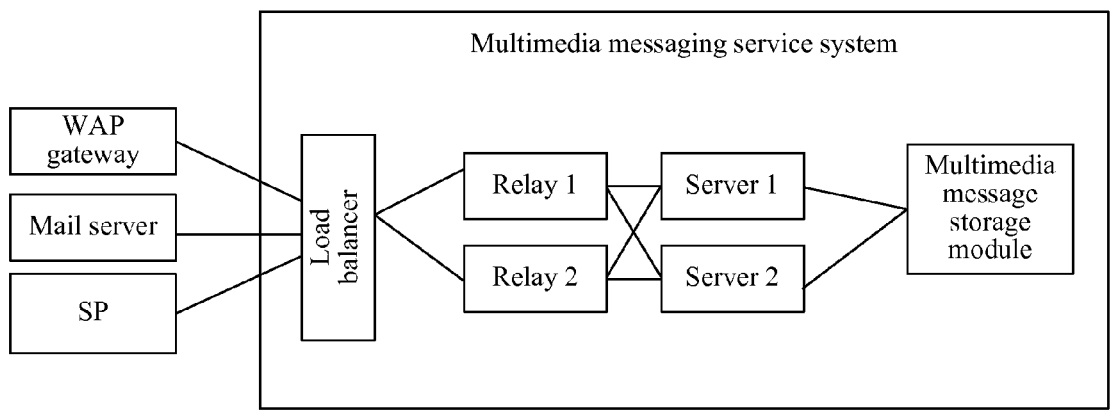
FIG. 2 is a schematic diagram of a structure of a multimedia messaging service system using a capacity extension by segments.
Figure 3:
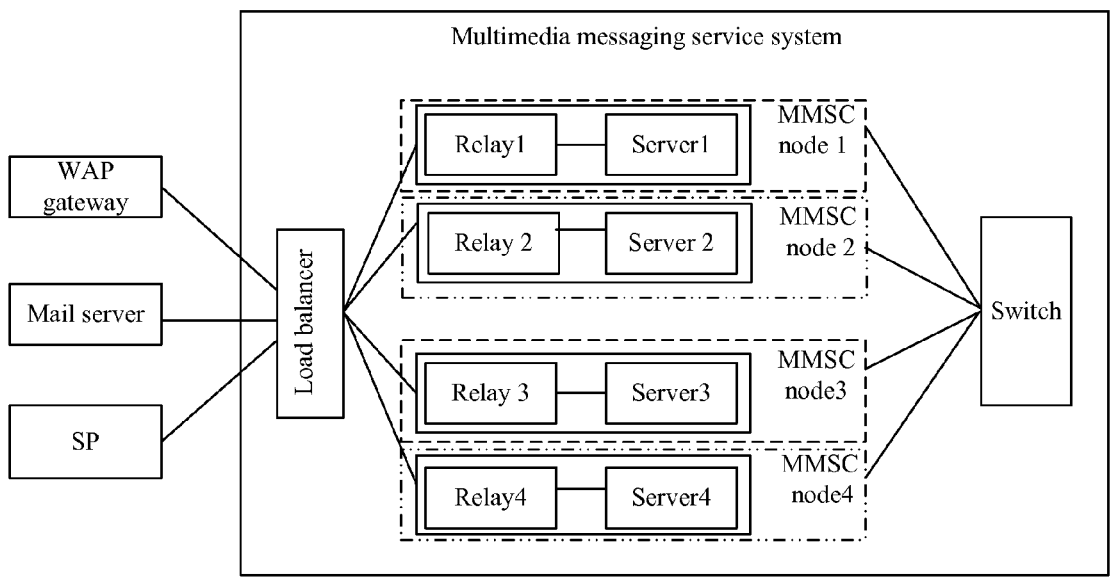
FIG. 3 is a diagram of a structure of a system for increasing a capacity of a multimedia messaging service system according to a preferred embodiment of the present invention.

FIG. 3 is a diagram of a structure of the system for increasing a capacity of a multimedia messaging service system according to a preferred embodiment of the present invention. Referring to FIG. 3, the system includes a load balancer, a switch and four separate MMSC nodes each consisting of a relay and a server corresponding to the relay.

Particularly, the four MMSC nodes constitute two sets of dual hosts and each set of dual hosts includes two node resource groups. Each node resource group has its own independent array of disks, or two node resource groups share a same array of disks, and each node resource group has its own dual-host Float Internet Protocol (FIP) address. All of the MMSC nodes in the system are numbered uniformly, and a port number of the server of the MMSC node is determined according to the type of a multimedia message receiver. The port number of the server indicates an application process of the server. For example, if a multimedia message is to be sent to a mobile terminal through a WAP gateway, a port number of the server of the MMSC node 1 may be 8001 and a port number of the server of the MMSC node 2 may be 8002. If a multimedia message is to be sent to a mail server or another MMSC node, the port number of the server of the MMSC node 1 may be 2501 and the port number of the server of the MMSC node 2 may be 2502. If a multimedia message is to be sent to an SP, the port number of the server of the MMSC node 1 may be 8801 and the port number of the server of the MMSC node 2 may be 8802. The FTP address of the MMSC node indicates an Internet Protocol (IP) address of the MMSC node and may also be set by means of the same sequential numbering as above.

When the load balancer receives a multimedia message sent through the WAP gateway by a mobile terminal, the load balancer determines an MMSC node to process the multimedia message, such as the MMSC node 1, according to load conditions of the MMSC nodes and relays the multimedia message to the relay 1 of the MMSC node 1. The relay 1 performs protocol translation of the multimedia message and then delivers it to the corresponding server 1.

The server 1 processes the multimedia message upon receiving the multimedia message and generates identification information including node number information. The identification information includes a Transaction ID and a Message ID.

If the multimedia message is a message to be sent to the mail server, the server 1 generates a response message and sends it to the corresponding relay 1. The relay 1 performs protocol translation of the response message and then sends it to the load balancer. The load balancer performs IP address translation (NAT, Network Address Translation) of the IP header of the response message and then sends it to the WAP gateway. Also, the server 1 sends the multimedia message to the load balancer through the corresponding relay 1. The load balancer performs source IP address translation (SNAT, Source Network Address Translation) of the IP header of the multimedia message and then sends it to the mail server.

If the multimedia message is a message to be sent to an SP server, the server 1 sends a response message to the WAP gateway through the corresponding relay 1 and the load balancer. The server 1 sends the multimedia message to the load balancer, and the load balancer stores session information of the multimedia message upon receiving the multimedia message, and performs SNAT of the IP header of the multimedia message and then sends it to the SP. The SP sends a response message to the load balancer upon receiving the multimedia message. The load balancer sends the response message to the relay 1 of the MMSC node 1 according to the stored session information.

If the multimedia message is a message to be sent through the WAP gateway by a mobile terminal to another mobile terminal, the server 1 generates a response message and a notification message respectively, sends the response message through the corresponding relay 1 to the WAP gateway and sends the notification message through the corresponding load balancer to the WAP gateway. The WAP gateway sends the messages to the mobile terminal according to address information in the messages. The notification message includes the identification information carrying the MMSC node number information and a Uniform Resource Locator (URL) of the notification message carries the port number of the server 1 receiving the multimedia message, such as 8001.

The WAP gateway sends to the load balancer a notification response message carrying the identification information. The load balancer determines an MMSC node to receive the notification response message, such as the MMSC node 2, according to load conditions of the MMSC nodes and sends the notification response message to the relay 2 of the MMSC node 2. The relay 2 sends the notification response message through a switch to the server of the MMSC node, such as server 1, according to the identification information of the notification response message, and the server of the MMSC node corresponds to the MMSC node number information of the identification information.

Then, the mobile terminal sends through the WAP gateway to the load balancer a message retrieval request carrying the port number and the identification information of the server 1. The load balancer sends the message retrieval request to the server corresponding to the server port number, such as the server 1, according to the server port number of the message retrieval request upon receiving the message retrieval request. The server 1 finds the multimedia message corresponding to the identification information of the message retrieval request upon receiving the message retrieval request, and sends it to the mobile terminal through the corresponding relay 1, the load balancer and the WAP gateway.

The mobile terminal sends to the load balancer through the WAP gateway a success message meaning successful download carrying the identification information. The load balancer determines an MMSC node to receive the success message, such as the MMSC node 3, according to load conditions of the MMSC nodes upon receiving the success message and sends it to the relay 3 of the MMSC node 3. The relay 3 sends the success message to the server of the MMSC node corresponding to the MMSC node number information of the identification information, such as the server 1, according to the identification information of the success message.

The load balancer receives a multimedia message sent from the SP, and determines an MMSC node to receive the multimedia message, such as the MMSC node 1, according to load conditions of the MMSC nodes and sends the multimedia message to the relay 1 of the MMSC node 1. The relay 1 performs protocol translation of the multimedia message and then delivers it to the corresponding server 1. Then the multimedia message is delivered in the above flow of sending the multimedia message to the mobile terminal through the WAP gateway.

The load balancer receives a multimedia message sent from the mail server, and determines an MMSC node to receive the multimedia message, such as the MMSC node 1, according to load conditions of the MMSC nodes and sends the multimedia message to the relay 1 of the MMSC node 1. The relay 1 performs protocol translation of the multimedia message and then delivers it to the corresponding server 1. The server 1 generates a response message and sends it to the mail server through the corresponding relay 1 and the load balancer. Then the multimedia message is delivered in the above flow of sending the multimedia message to the mobile terminal through the WAP gateway.

Since underlying platforms for all components of the MMSC nodes in the system are based upon the same message bus and an appropriate communication manner can be selected automatically according to a connection deployment, therefore communication between the hosts is conducted through the switch and communication internal in the host is conducted through a shared memory. That is, for a session initiation message, a relay delivers it to the server located in the same host as the relay through a shared memory. For a transaction handling process, the relay delivers a message to a server processing the present session according to identification information of the message. A message initiated from a server is delivered to a relay on the present host through a shared memory.

Normally, the two sets of resource groups in the dual hosts of the system operate respectively on two single hosts among the dual hosts. When one single host among the dual hosts fails due to the host or application software, the entire resource group on the host is switched to the other host through the switch for operating. When a process of the relay/server of the failing host is operated, the original FTP address is still in use, and an IP address in a multimedia message processed on the relay and the server is not changed, so that the failure of the host has no influence upon processing of the multimedia message. At this time, two sets of relays/servers operate on a host, and each set can use only a half of CPU and memory resources of the system, so a processing power of each set of relay/server is halved but this does not influence the effectiveness of the entire system, both the message buffered due to the failure and the ongoing session processing is reserved, and only a new message submitted during switching due to the failure is lost. In this case, since the load balancer can balance loads of the respective MMSC nodes, a sum of processing powers of the two sets of relays/servers of the entire host can be substantially equivalent to that of a normal cluster node, that is, a system with a number N of MMSC nodes loses 1/N of a processing power of the system upon failure of a single point. In this embodiment, the system with four hosts loses 25% of the processing power. In a practical application, the larger the N is, the lower the proportion of loss will be.

Further, the relay in this embodiment of the present invention are components implemented by software, and an initial memory is not allocated in a way with the consistency of a maximum memory and a minimum memory but is scheduled automatically by software so as to reduce a memory occupied during switching due to a failure.

Three embodiments are described below respectively. The message distribution device in the three embodiments is a load balancer. The method that the load balancer determines an MMSC node to receive a multimedia messaging service request is by selecting an MMSC node whose load is the smallest among all the MMSC nodes. The method includes following three methods.

In one method, the load balancer sends detection information to the MMSC nodes upon receiving a multimedia messaging service request, receives response information from the respective MMSC nodes, and determines the most rapidly responding node as the node with the minimum load.

In another method, upon receiving a new multimedia messaging service request, the load balancer records the number of multimedia messaging service requests processed by each MMSC node, and determines the node currently processing the smallest number of multimedia messaging service requests as the node with the minimum load.

In yet another method, load of each MMSC node resource group is calculated according to CPU model numbers, the number of CPUs, a memory, and the number of current connections of the MMSC node resource group, and the node with the minimum load is determined as the node with the minimum load. A specific conversion process is known in the conventional art and descriptions thereof will be omitted here.

A relay and a server corresponding to the relay in the embodiments of the present invention operate on the same host to constitute an independent MMSC node. A message received by the relay can be delivered directly to the server corresponding to the relay through a shared memory, and the server delivers a message for transmission directly to the relay corresponding to the server through the shared memory.

The One Embodiment

Figure 4:
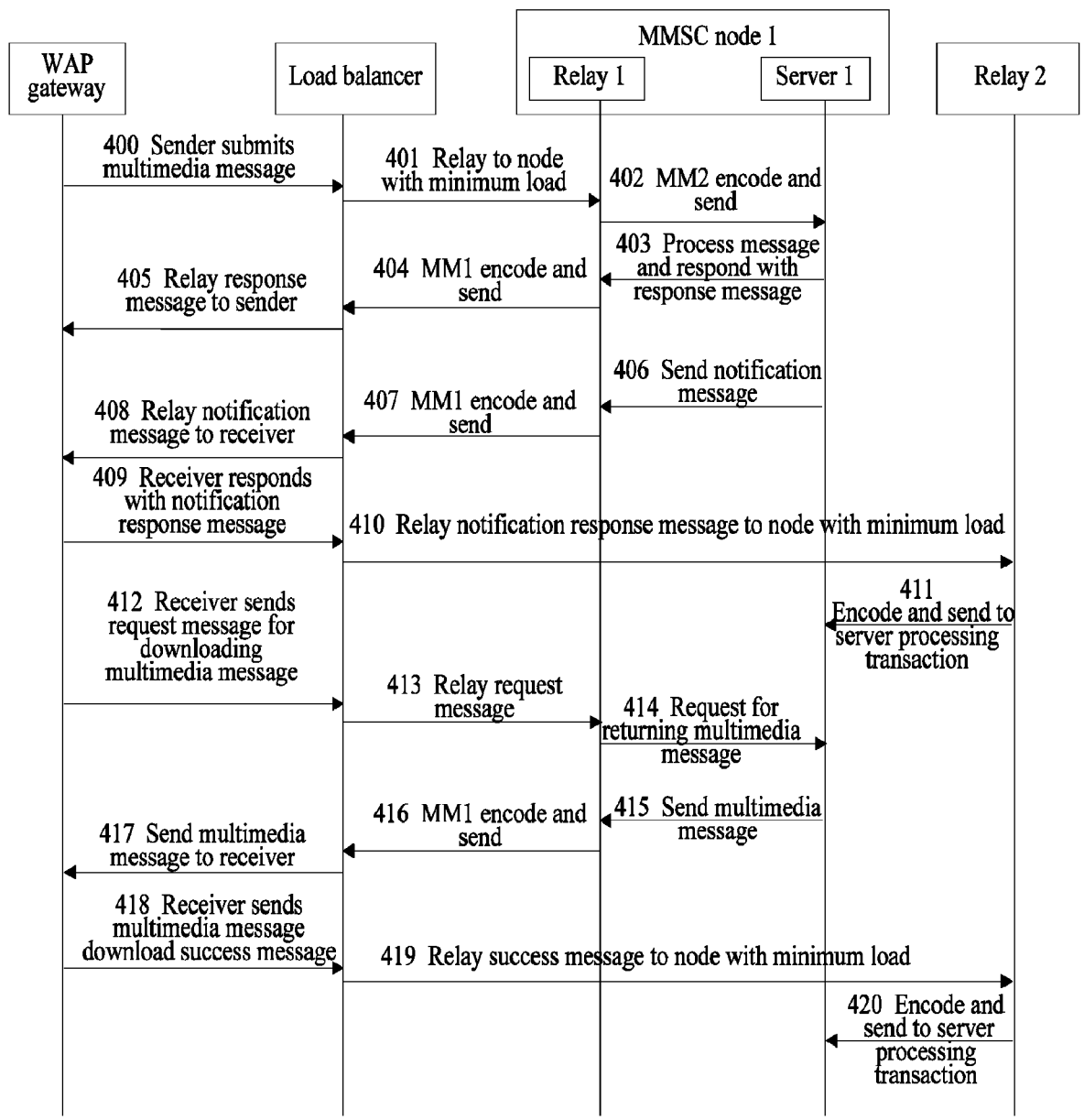
FIG. 4 is a flow chart of a method for implementing a multimedia messaging service from a mobile terminal to a mobile terminal according to an embodiment of the present invention.

Referring to FIG. 4, FIG. 4 is a flow chart of a method for implementing a multimedia messaging service sent by a mobile terminal to another mobile terminal according to the one embodiment of the present invention. The method includes the following steps.

Steps 400 to 402: A sender sends an MM1 multimedia message submit request (MM1_Submit.req) to the load balancer through the WAP gateway. The load balancer sends the multimedia message to the relay of the minimum load MMSC node, such as the relay 1. The relay 1 performs MM2 encoding of the multimedia message and then submits it to the server 1 on the present node through a shared memory.

In this step, before the sender sends the multimedia message to the load balancer, a Transfer Control Protocol (TCP) connection is firstly established between the sender, the gateway and load balancer, and a Hypertext Transfer Protocol (HTTP) connection is established between the load balancer and the relay of the MMSC node. Data transmission between the sender and the MMSC node is enabled through the two connections. A specific process of establishing the connections is known in the conventional art and descriptions thereof will be omitted here.

Steps 403 to 405: The server 1 stores the multimedia message upon receiving the multimedia message, performs processing such as format translation and the like, and returns a response message to the relay 1 of the host. The server 1 also generates identification information including node number information. The relay 1 performs MM1 encoding of the received response message and then returns it to the load balancer in the original HTTP connection. The load balancer performs an NAT operation on the IP header of the response message and then sends it to the WAP gateway through the established TCP connection, and in turn the WAP gateway relays the message to the sender according to a sender address in the response message.

Step 406: The server 1 constructs a MM2 notification message (MM2_Notification.ind) and delivers it to the relay 1 on the present node.

The notification message includes the identification information generated by the MMSC node 1, where the identification information includes the node number information of the present node, and address information of a receiver. A URL of the notification message carries the port number of the server of the node, such as 8001, and an IP address of the URL is an outward-mapped public IP address of the multimedia messaging service system.

Steps 407 to 408: The relay 1 performs MM1 encoding of the notification message and then sends it to the load balancer. The load balancer performs an SNAT operation on the notification message and then sends it to the WAP gateway according to the receiver address in the notification message. The WAP gateway relays the message to the receiver.

Step 409: The receiver responds with an MM1 notification response message (MM1_NotifyResp.ind) upon receiving the notification message.

The notification response message carries the identification information of the notification message. A response address is an information server address set by a mobile terminal, that is, an SNAT operated source IP address, and thus points to the load balancer.

Step 410: The load balancer determines the MMSC node with the minimum load upon receiving the notification response message, and sends the notification response message to the relay of the MMSC node with the minimum load, such as the relay 2 of the MMSC node 2.

Step 411: The relay 2 performs MM2 encoding upon receiving the notification response message while recognizing the identification information of the notification response message, and relays the notification response message to the server of the MMSC node corresponding to the MMSC node number information of the identification information.

In this step, the server receiving the notification response message is a server processing the present session. The server receiving the notification response message is server 1 in this embodiment.

Step 412: The WAP gateway sends an MM1 message retrieval request (MM1_Retrieve.req) message of the sender to the load balancer.

The request message includes a message identifier of the multimedia message, and URL of the multimedia message includes the port number of the server processing the multimedia message to be downloaded, such as 8001 in this embodiment.

Steps 413 to 414: The load balancer distributes the message retrieval request to the relay on the MMSC node processing the present transaction according to the port number in the URL of the request message. The relay is relay 1 in this embodiment. The relay 1 performs MM2 encoding of the request message and sends it to the server 1 of the MMSC node through the shared memory.

Steps 415 to 417: The server 1 searches in all multimedia messages stored on itself the corresponding multimedia message according to the message identifier in the request message, and returns the corresponding multimedia message to the relay 1 through the shared memory. The relay 1 performs MM1 encoding of the multimedia message and then sends it to the load balancer in the original HTTP connection. The load balancer performs an NAT operation on the IP header of the multimedia message and then sends it to the gateway through the reserved TCP connection. The WAP gateway relays the multimedia message to the receiver.

Steps 418 to 420: The receiver sends an MM1 success message (MM1_acknowledge.ind) carrying the transaction identification information to its information server, i.e., the load balancer, upon receiving the multimedia message. The load balancer relays the success message to the relay of the MMSC node with the minimum load, such as the relay 2. The relay 2 performs MM2 encoding upon receiving the success message while recognizing the identification information in the message, and relays the success message to the server, a server processing the present session, of the MMSC node corresponding to the MMSC node number information of the identification information. The server processing the present session is server 1 in this embodiment. The server 1 upon receiving the success message deletes the stored multimedia message and releases the resources, thereby terminating present transaction processing.

In the above steps, the steps 400 to 405 constitute a process in which the sender submits the multimedia message and receives the response message with which the server responds, and the steps 406 to 411 constitute a process in which the server sends the notification message to the receiver and receives the notification response message. Steps 412 to 420 constitute a process in which the receiver receives the multimedia message and sends the success message.

Another Embodiment

Figure 5:
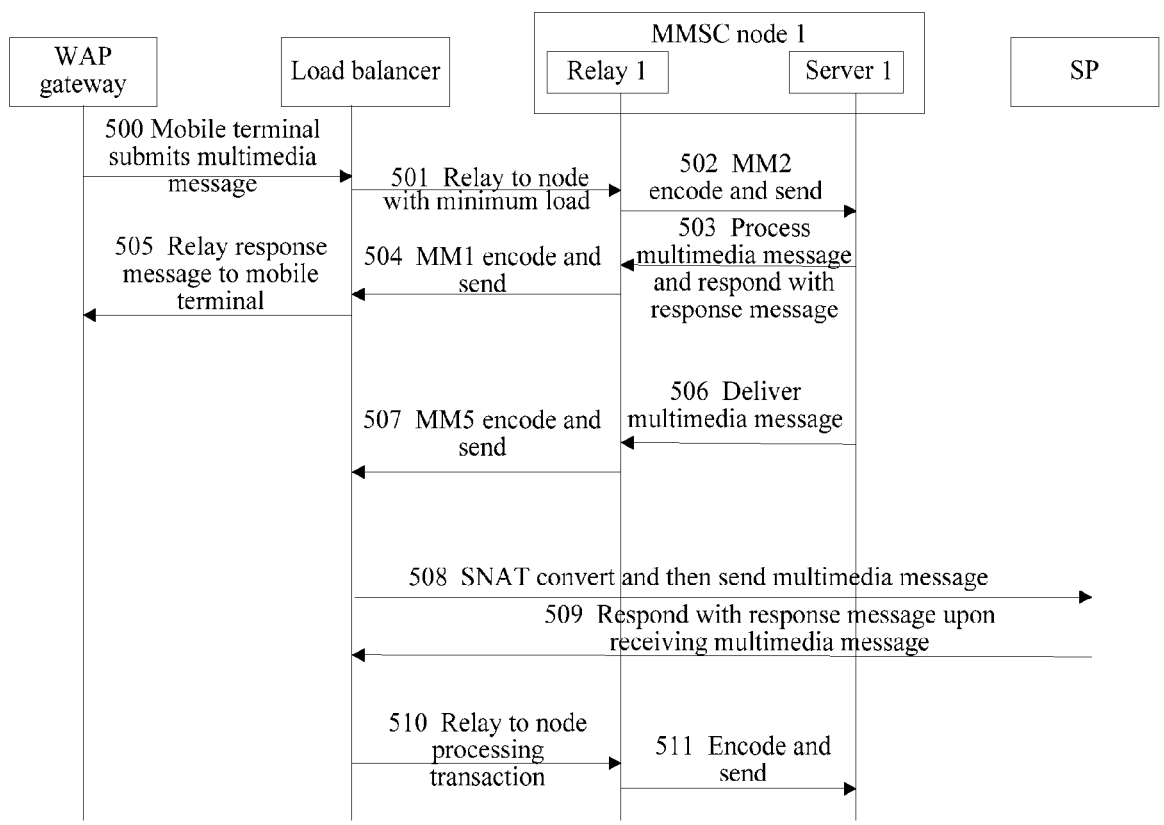
FIG. 5 is a flow chart of a method for implementing a multimedia messaging service from a mobile terminal to an SP according to another embodiment of the present invention.

Referring to FIG. 5, FIG. 5 is a flow chart of a method for implementing a multimedia messaging service sent by a mobile terminal to an SP according to the another embodiment of the present invention and the method includes the following steps.

The steps 500 to 505 constitute a process in which a mobile terminal of the sender submits a multimedia message and receives a response from an MMSC node, and are the same as the steps 400 to 405 in the embodiment as illustrated in FIG. 4.

Steps 506 to 508: The server 1 constructs an MM2 multimedia message delivery request message (MM2_Delivery.req), and the relay 1 of the node encodes it into an MM7 multimedia message delivery request message (MM7_Delivery.req) and then sends it to the load balancer. The load balancer performs an SNAT operation on the request message and then sends it to a corresponding SP according to address information of a receiver in the request message, i.e., an IP address of the SP.

Steps 509 to 510: The SP sends an MM7 response message (MM7_Delivery.res) to the load balancer. The load balancer relays the response message to the relay of the MMSC node processing the present session, according to the stored session information. The relay of the MMSC node processing the present session is relay 1 in this embodiment.

Since the MM7_Delivery.req/res are in a socket session, the load balancer deliver the MM7_Delivery.res to the node processing the present transaction according to the stored session information.

Step 511: The relay 1 receives and performs MM2 encoding of the response message and sends it to the sever 1. The server 1 upon receiving the response message deletes the stored multimedia message and releases the resources, thereby terminating present transaction processing.

The steps 506 to 511 in this embodiment constitute a process in which the server of the MMSC node delivers the multimedia message to the SP and receives a response message from the SP.

If the SP is replaced with a mail server, then the steps 506 to 508 are as follows. The server 1 constructs an MM2 multimedia message sending request message (MM_SMTP_Send), and the relay 1 of the node performs MM3 encoding and then sends it to the load balancer. The load balancer performs an SNAT operation of the request message and then sends it to the corresponding mail server according to the address information of the receiver, i.e., the IP address of the mail server. The steps 509 to 511 may be omitted.

Yet Another Embodiment

Figure 6:
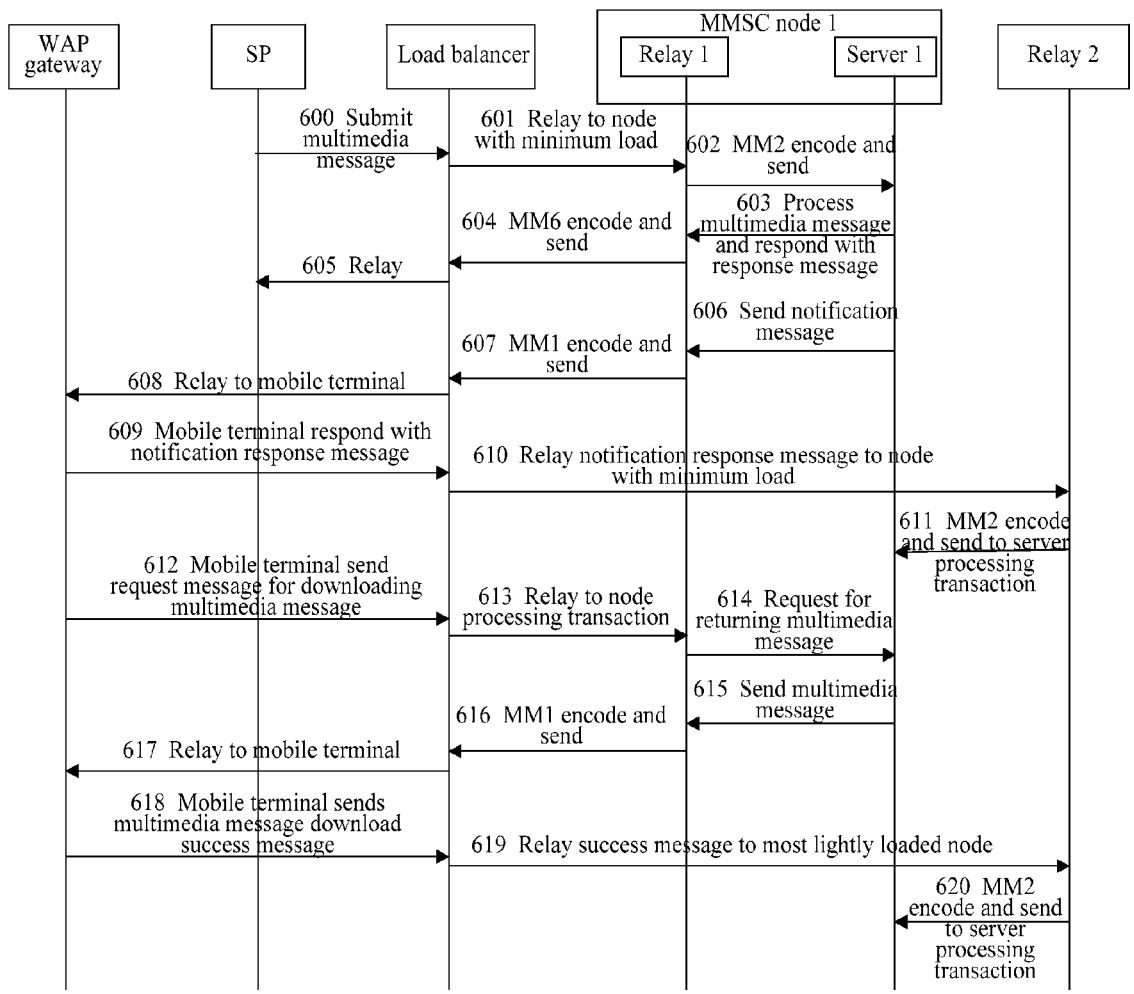
FIG. 6 is a flow chart of a method for implementing a multimedia messaging service from an SP to a mobile terminal according to yet another embodiment of the present invention.

Referring to FIG. 6, FIG. 6 is a flow chart of a method for implementing a multimedia messaging service from an SP to a mobile terminal according to the yet another embodiment of the present invention and the method includes the following steps.

Steps 600 to 602: An SP submits an MM7 multimedia message submit request (MM7_Submit.req) message to the load balancer. The load balancer determines the MMSC node with the minimum load and sends the request message to relay of the MMSC node with the minimum load, such as the relay 1. The relay 1 performs MM2 encoding of the request message and then submits it to the server 1 through a shared memory.

Steps 603 to 605: The server 1 processes the request message and returns an MM2 response message (MM2_Submit.res). The relay 1 receives the response message, performs MM7 encoding and returns it to the load balancer in the original HTTP connection. The load balancer performs an NAT operation on the IP header of the response message and then sends it to the SP through the reserved TCP connection.

The steps 606 to 620 may be the same as the steps 406 to 420.

In this embodiment, the steps 600 to 605 constitute a process in which the SP submits the multimedia message and receives the response message, the steps 606 to 611 sends for the server the notification message to the receiver and receives the response message with which it responds, and the steps 612 to 620 constitute a process in which the receiver retrieves the multimedia message and sends the success message.

If the SP is replaced with a mail server, then step 800 is that the mail server submits an MM3 multimedia message submit request (MM3_SMTP.Send) to the load balancer, and the steps 603 to 605 may be omitted while the other steps remain the same.

Figure 7:
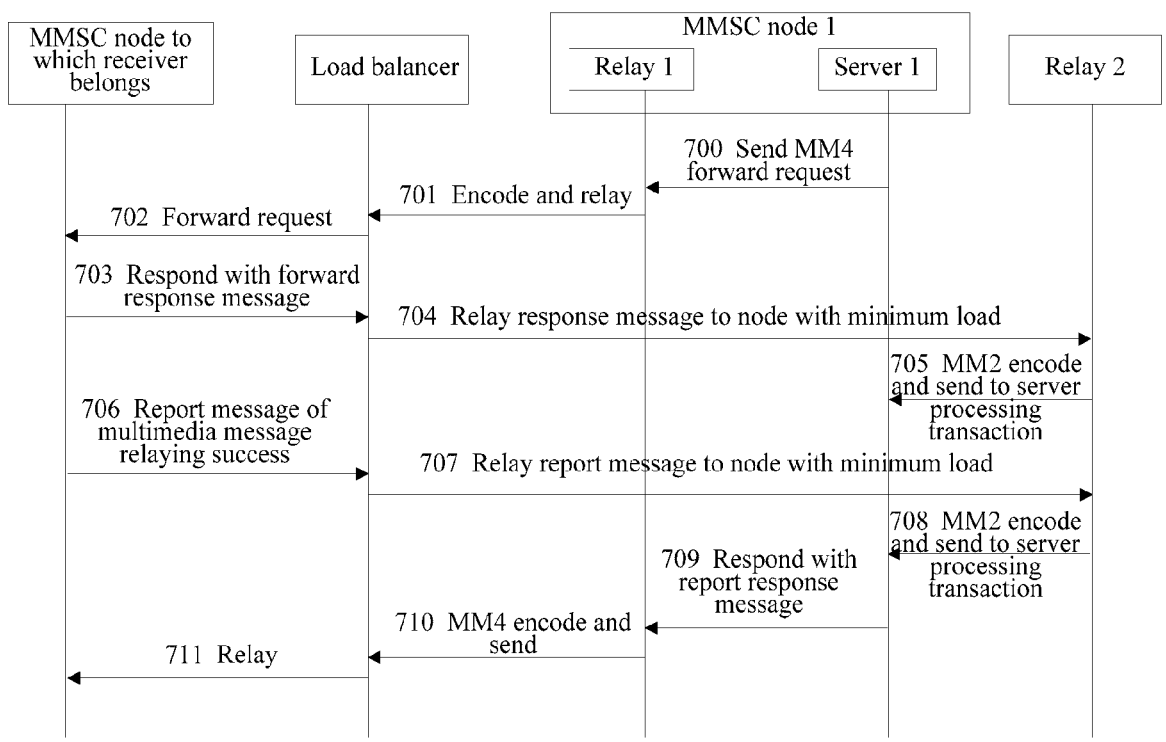
FIG. 7 is a flow chat of a method for forwarding outward a multimedia message service via an MM4 interface in the system as illustrated in FIG. 3.

When a sender and a receiver of a multimedia message are not in the same network, an MMSC node to which the sender belongs forwards the received multimedia message to an MMSC node to which the receiver belongs for processing. A flow chart of the method at this time is as illustrated in FIG. 7. Referring to FIG. 7, the method includes the following steps.

Steps 700 to 702: The server 1 of the MMSC node receiving a multimedia messaging service request constructs contents of a multimedia message to be relayed and control information into an MM2 forward request message (MM2_Forward.req). The control information includes identification information and an address of a receiver. The relay 1 encodes it into an MM4 forward request message (MM4_Forward.req) and then sends it to the load balancer. The load balancer performs an SNAT operation of the forward request message and then sends it to an MMSC node to which the receiver belongs.

Steps 703 to 705: The MMSC node to which the receiver belongs sends an MM4 forward response message (MM4_Forward.res) to the load balancer upon receiving the forward request message. The load balancer sends the response message to the relay of the MMSC node with the minimum load, such as the relay 2. In turn the relay 2 parses the identification information of the response message and routes the response message to a server processing the session, the server 1 in this embodiment.

Steps 706 to 708: The MMSC node receiving the forward request message sends an MM4 report message of multimedia message relaying success (MM4_DeliveryReport.rep) to the load balancer upon successful issuing of the multimedia message. The load balancer relays it to the relay with the minimum load, such as the relay 2. The relay 2 parses the identification information in the report message and routes the report message to a server processing the session, the server 1 in this embodiment.

Steps 709 to 711: The server 1 sends an MM4 report response message (MM4_Deliver.res) to the load balancer through the relay 1 on the node. The load balancer performs an SNAT operations of the response message and then sends it to the MMSC node receiving the forward request message to which the receiver belongs, thereby terminating present transaction processing.

In this embodiment, the steps 700 to 705 constitute a process in which the MMSC node receiving the multimedia messaging service request sends the MM4 forward request message and receives the forward response message, and the steps 706 to 711 constitute a process in which the MMSC node to which the receiver belongs sends the MM4 report message of multimedia message relaying success upon successful relaying of the multimedia message and receives the report response message.

Figure 8:
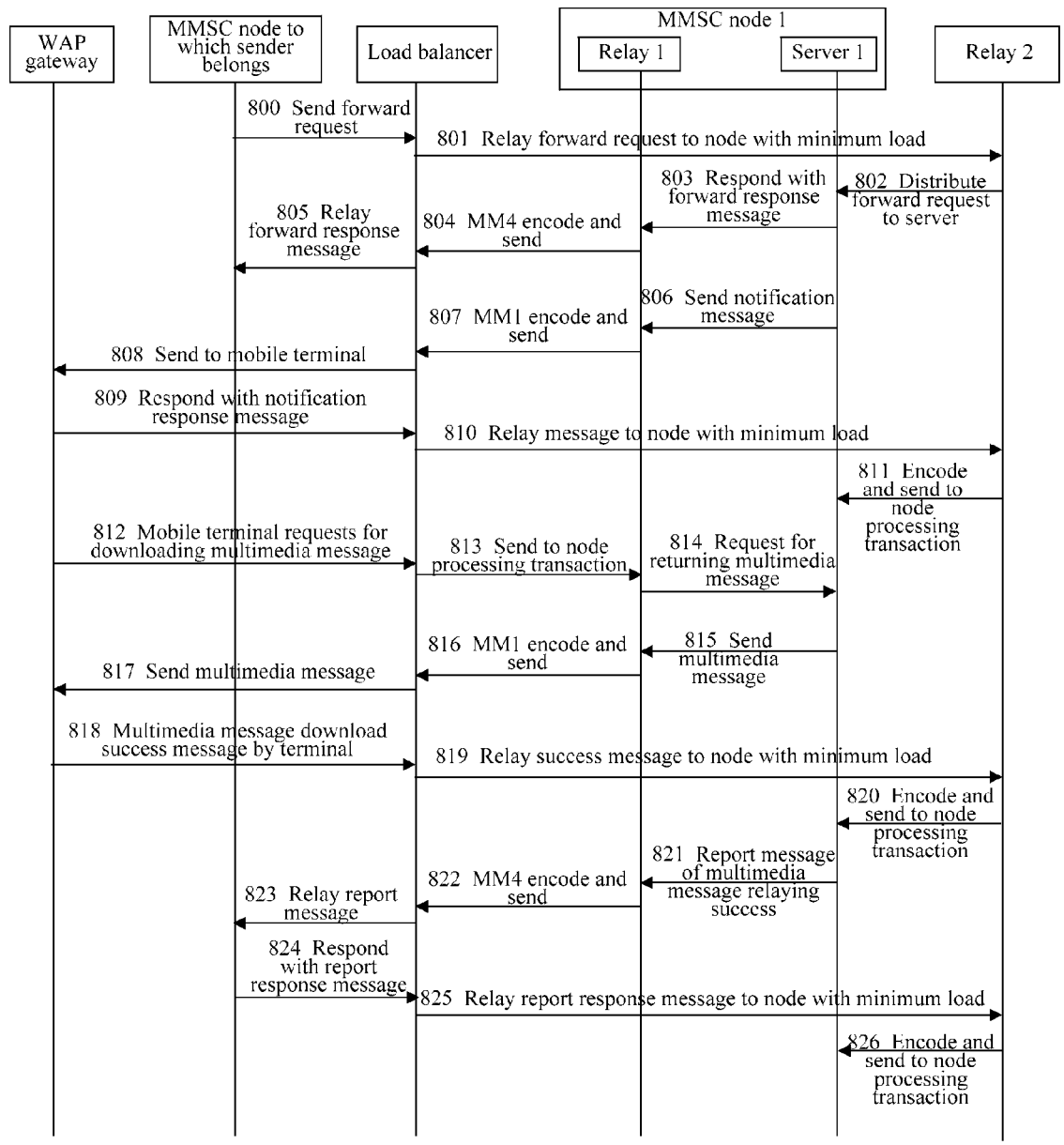
FIG. 8 is a flow chat of a method for forwarding inward a multimedia message service via an MM4 interface in the system as illustrated in FIG. 3.

When an MMSC node to which the sender belongs sends the forward request, an MMSC node receiving the forward request message in the receiving network proceeds with an inward forward flow. It is assumed that the receiver is a mobile terminal, and FIG. 8 illustrates a flow chart of a method for inward MM4 forward. Referring to FIG. 8, the method includes the following steps.

Steps 800 to 802: An MMSC node to which the sender belongs submits an MM4 forward request message (MM4_Forward.req) to the load balancer. The load balancer sends the request message to the relay of the node with the minimum load in the receiving network, such as the relay 2. The relay 2 distributes it to the server 1 according to a message identifier in the request message.

It is required in this step that multimedia messages with the same message identifier shall be distributed to the same server.

Steps 803 to 805: The server 1 constructs an MM2 forward request response message (MM2_Forward.res) upon receiving the request message, and the relay 1 on the node encodes it into an MM4 forward request response message (MM4_Forward.res) and then sends the message to the load balancer. The server 1 records the old message identifier and transaction identifier and generates a new message identifier and transaction identifier. The load balancer receives the forward request response message sent from the relay and then performs an SNAT operation on the response message and relays it to the MMSC node sending the forward request message in the sending network.

Step 806: The server 1 constructs an MM2 notification message (MM2_Notification.ind) to be sent to a mobile terminal of the receiver with the new message identifier and transaction identifier and sends the message to the relay 1 on the node.

In this step, a URL in the notification message includes the port number of the server processing the transaction, such as 8001.

The steps 807 to 820 are the same as the steps 407 to 420 in the flow of the method for implementing a multimedia messaging service method from a mobile terminal to a mobile terminal according to the first embodiment of FIG. 4 and descriptions thereof will be omitted here.

Steps 821 to 823: The server 1 generates an MM2 report message of multimedia message relaying success (MM2_DeliveryReport.req) including information on the old message identifier and the new transaction identifier. The relay 1 of the node encodes it into an MM4 report message of multimedia message relaying success (MM4_DeliveryReport.req) and then sends it to the load balancer. The load balancer performs an SNAT operation on the report message and then sends it to the MMSC node sending the forward request message in the sending network according to the information on the old message identifier.

Steps 824 to 825: The MMSC node sending the forward request message in the sending network returns an MM4 report response message (MM4_DeliveryReport.res) to the load balancer upon receiving the report message of multimedia message relaying success. The load balancer sends the response message to the relay of the MMSC node with the minimum load, such as the relay 2.

Step 826: The relay routes the message to the server 1 processing the session according to the identification information in the response message.

In this embodiment, the steps 800 to 805 constitute a process in which the MM4 forward request message is received and the MM4 forward response is sent, the steps 806 to 811 constitute a process in which the notification message is sent to the mobile terminal and a process in which the notification response message is received from the mobile terminal, the steps 812 to 820 constitute a process in which the mobile terminal retrieves the multimedia message and sends the success message, and the steps 821 to 826 constitute a process in which an MMSC node to which the receiver belongs sends the report message of multimedia message relaying success upon successful relaying of the multimedia message and receives the report response message.

The WAP gateway in the present invention can also be an IP gateway.

In a practical application, the number of MMSC nodes in the system can be set as required for a service, less or more than four.

Figure 9:
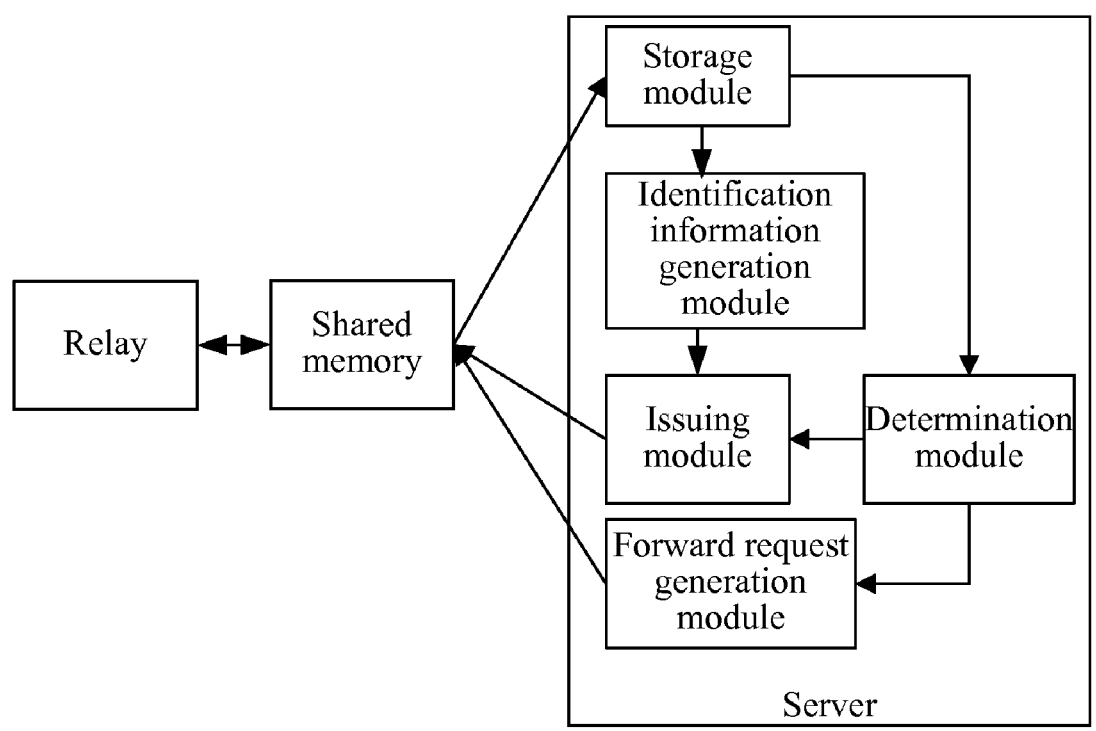
FIG. 9 is a diagram of a structure of an MMSC node according to an embodiment of the present invention.

FIG. 9 is a diagram of a structure of an MMSC node according to an embodiment of the present invention. As illustrated in FIG. 9, the node includes a relay, a server corresponding uniquely to the relay and a shared memory.

Particularly, the relay is adapted to receive a multimedia message sent from a message distribution device and relay the multimedia message to the server through the shared memory. The server is adapted to store the multimedia message sent from the relay and send it to the relay through the shared memory. The multimedia message is delivered to a receiver through the relay and the message distribution device. The relay is adapted to transfer the multimedia message between the relay and the corresponding server.

Specifically, the server includes a storage module adapted to store the multimedia message sent from the relay through the shared memory; an identification information generation module adapted to generate identification information including an information identifier and a transaction identifier upon receiving the multimedia message; and an issuing module adapted to deliver the multimedia message stored in the storage module to the receiver of a multimedia messaging service through the shared memory and the relay according to the identification information.

The server further includes a determination module and a forward request generation module. Particularly, the determination module is adapted to determine whether address information of the receiver in the multimedia message belongs to the MMSC node. If yes, the issuing module delivers the multimedia message. Otherwise, the forward request generation module generates a forward request message and sends it to the message distribution device through the shared memory and the relay.

As can be seen from above, the method, system, and device for implementing a large capacity multimedia messaging service provided according to the embodiments of the present invention propose a peer cluster solution for a horizontal capacity extension of a large capacity multimedia messaging service and have the following advantages.

Firstly, the relay and the server are integrated to constitute an independent MMSC node, so that processing of contents of the same multimedia message is accomplished on the same node in the system, thereby reducing cross accesses between nodes, improving the efficiency of transferring the message and hence increasing the processing power of the multimedia messaging service system. Further, all MMSC nodes are numbered uniformly and number information is made correspond to the port number of the server, so that the message distribution device can send a message retrieval request directly to the MMSC node processing the session, and the relay can deliver the multimedia message directly to the corresponding server, thereby improving the efficiency of transferring the message, reducing greatly the demand for a transmission speed of network devices and increasing the processing power of the multimedia messaging service system.

Secondly, each MMSC node can enable independently I/O reading and writing of a multimedia message, thereby optimizing the storage architecture of the multimedia message and avoiding the problem of limited service processing of the multimedia messaging service system due to centralized reading and writing of the multimedia messages. Further, the respective MMSC nodes in the peer cluster perform the multimedia messaging service concurrently, thereby improving the processing speed of the multimedia messages and hence increasing the processing power of the multimedia messaging service system.

Thirdly, as new demands for the multimedia messaging service constantly emerge, a proportion of the demand for a processing power required for the relay and the server will vary dynamically, and the relay and the server are integrated on a host to constitute an independent node in the embodiments of the present invention, thereby achieving an online smooth extension of the system. Each MMSC node can adjust dynamically CPU and memory resources occupied for a relay and a server according to a practical consumption so as to be adapted to the varying service demand, thereby avoiding a waste of the resources.

Fourthly, the load balancer determines an MMSC node to receive a service request according to a load condition of a relay and a server corresponding to the relay instead of allocating a service by number segments, and makes identification information generated by the server correspond to number information of the MMSC node, so that the relay can relay a message to the server processing the present service request, which corresponds to the node number information, according to the identification information, thereby achieving indeed a load balancer among the MMSC nodes.

Fifthly, the inventive system is structured simply, and the respective MMSC nodes can be configured with the same system software and thus can be maintained and managed equally thereby improving maintainability of the system.

What is claimed is:

1. A method for increasing a capacity of a multimedia messaging service system, comprising the steps of:
    determining, by a message distribution device upon receiving a multimedia message sent from a sender, a first Multimedia Messaging Service Center (MMSC) node to receive the multimedia message, and relaying the multimedia message to a relay of the first MMSC node;
    delivering, by the relay of the first MMSC node, the multimedia message to a server of the first MMSC node for storage, wherein the server of the first MMSC node is one-to-one corresponding to the relay of the first MMSC node;
    generating, by the server of the first MMSC node, first identification information comprising a first message identifier and a first transaction identifier, wherein the first transaction identifier comprises number information of the first MMSC node;
    generating, by the server of the first MMSC node, a notification message comprising the first identification information and a Uniform Resource Locator (URL);
    sending the notification message to a receiver through the relay of the first MMSC node and the message distribution device, wherein address information of the receiver in the multimedia message is in a network of the first MMSC node; and
    retrieving, by the receiver, the multimedia message from the server according to the first identification information and the URL in the notification message.

2. The method according to claim 1, after the notification message is sent to the receiver, the method further comprises:
    returning, by the receiver, a notification response message comprising the first identification information to the load balancer;
    determining, by the load balancer, an MMSC node to receive the notification response message according to load conditions of the respective MMSC nodes and relaying it to the MMSC node receiving the notification response message; and
    relaying, by a relay of the MMSC node receiving the notification response message, the notification response message to the server of the first MMSC node according to the first identification information in the notification response message.

3. The method according to claim 2, wherein the URL of the notification message carries a port number of the server corresponding to the number information of the first MMSC node;
    the retrieving by the receiver of the multimedia message from the server according to the first identification information and the URL in the notification message comprises:
    sending, by the receiver, a message retrieval request carrying the port number to the load balancer;
    sending, by the load balancer, the message retrieval request to the relay of the first MMSC node according to the port number;
    delivering, by the relay of the first MMSC node, the message retrieval request to the server of the first MMSC node; and
    sending, by the server of the first MMSC node upon receiving the message retrieval request, the multimedia message to the receiver through the relay of the first MMSC node and the load balancer.

4. The method according to claim 1 wherein the address information of the receiver in the multimedia message is not in the network of the first MMSC node, the sending by the server of the multimedia message to the receiver through the relay of the first MMSC node and the message distribution device comprises:
    sending, by the server of the first MMSC node, a forward request message comprising the multimedia message to the load balancer through the relay of the first MMSC node;
    relaying, by the load balancer, the forward request message to an MMSC node to which the receiver belongs; and
    sending, by a second MMSC node which is an MMSC node receiving the multimedia message in a network of the receiver, the multimedia message to the receiver; and
    wherein the multimedia message carries the first identification information.

5. The method according to claim 4, after the first MMSC node sends the multimedia message to the second MMSC node, the method further comprises:
    returning, by the second MMSC node, a forward response message comprising the first identification information to the load balancer;
    sending, by the load balancer, the forward response message to an MMSC node to which the sender belongs; and
    relaying, by a relay of the MMSC node receiving the forward response message, the forward response message to the server of the first MMSC node according to the first identification information.

6. The method according to claim 4, wherein after the second MMSC node receives the forward request message, the server of the second MMSC node stores the first identification information carried in the multimedia message and generates second identification information comprising a second message identifier and a second transaction identifier.

7. The method according to claim 6, wherein the second MMSC node sends the multimedia message to the receiver according to the second identification information.

8. The method according to claim 7, after the second MMSC node sends the multimedia message to the receiver, the method further comprises:
    generating, by the server of the second MMSC node, a report message of multimedia message relaying success comprising the first identification information.

9. The method according to claim 8, wherein the second MMSC node sends the report message of multimedia message relaying success to the load balancer; the load balancer sends the report message of multimedia message relaying success to an MMSC node to which the sender belongs; a relay of the MMSC node receiving report message of multimedia message relaying success sends the report message of multimedia message relaying success to the server of the first MMSC node according to the first identification information in the report message of multimedia message relaying success.

* * * * *